Nov. 11, 1969  P. SZCUPAK ET AL  3,477,730
SHAFT SEAL
Filed March 26, 1965  2 Sheets-Sheet 1
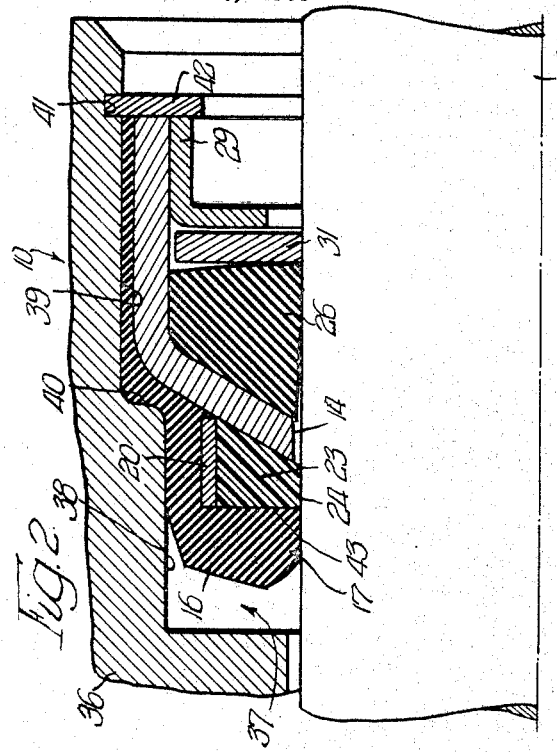
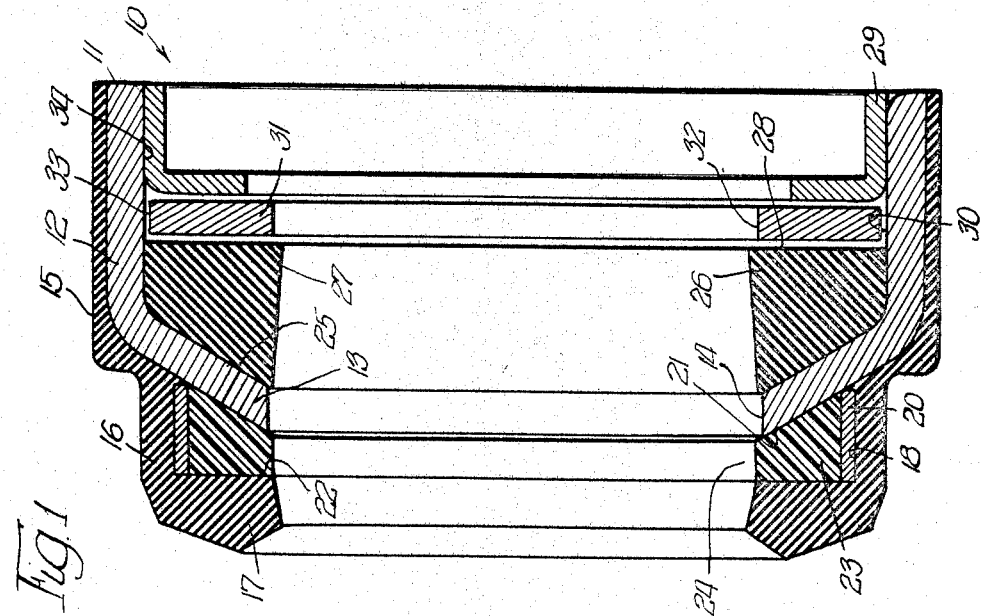
Inventors:
Peter Szcupak,
Kare Andersen,
By Greist, Lockwood, Greenawalt & Dewey,
Attys.

Inventors:
Peter Szcupak,
Kare Andersen.

United States Patent Office 3,477,730
Patented Nov. 11, 1969

3,477,730
SHAFT SEAL
Peter Szcupak, Chicago, and Kare Andersen, Elgin, Ill., assignors to Chicago Rawhide Manufacturing Company, Chicago, Ill., a corporation of Illinois
Filed Mar. 26, 1965, Ser. No. 443,047
Int. Cl. F16j 15/32, 15/54
U.S. Cl. 277—24                    10 Claims

ABSTRACT OF THE DISCLOSURE

A shaft seal including an anti-extrusion means for sealing a reciprocable shaft in fluid-tight relation to an opening in a machine housing or the like. The seal casing includes an axially extending portion and a radially inwardly extending flange portion, and the anti-extrusion means is in the form of an element bonded to a portion of the flange and disposed between the flange and the primary seal. It is preferably surrounded on its outer periphery by a rigid support ring, so that fluid pressures directed axially through the primary sealing element to the anti-extrusion means force the anti-extrusion means radially inwardly and against the shaft to be sealed so that the seal can not be extruded axially of the casing inwardly thereof between it and the shaft. The seal itself abuts the anti-extrusion means and the two are of substantially the same inner diameter, which is slightly smaller than the inner diameter of the inner periphery of the casing flange.

---

The present invention relates to a new and improved shaft seal assembly especially suited for use with reciprocable shafts or rods in high pressure installations. More specifically, the shaft seal assembly of the present invention includes a unique combination of elements providing for sealing of the shaft against high pressure fluid to prevent loss of the highly pressurized fluid from the surrounding housing either along the shaft or the seal receiving bore in the housing.

Suitable means is provided to prevent forces developed by the highly pressurized fluid from extruding the fluid seal along the shaft. Extrusion of the fluid seal is experienced in some prior art designs when they are used in high pressure applications. Additional means is provided to clean the shaft for entry into the high pressure fluid sealing area through a wiper element and scraper. Disposed outwardly of the wiper element is provided the scraper which strips the shaft of any formations or deposits or foreign material such as ice, mud or the like which would interfere with the efficiency of the sealing element of the sealing assembly. The wiper maintains the shaft free of any small foreign particles not removed by the scraper.

In conjunction with the foregoing features of the present invention, a novel method of positioning and molding the anti-extrusion means in situ simultaneously with the molding of the sealing lip forms a part of the invention. Since the anti-extrusion element is disposed immediately adjacent the sealing lip, the centering of the same relative to the sealing lip is desirable to insure substantially uniform sealing contact around the circumference of the shaft, and provide axial resistance to extrusion of the flexible material forming the sealing element when subjected to the anticipated high pressures.

It is a principal object of the present invention to provide a unitized shaft seal assembly including a shaft seal, an anti-extrusion means to maintain said shaft seal in proper sealing relation, a wiper element to clean the shaft from fine foreign particles and the like prior to entry into the shaft sealing area and a shaft scraper to remove deposits on the shaft with all of the foregoing being sealingly mounted within a bore housing.

It is a further object of this invention to provide a new and improved fluid seal adapted for high pressure applications having an anti-extrusion means positioned immediately adjacent the fluid seal means.

It is a further object of this invention to provide a shaft sealing arrangement wherein an annular casing is provided with a radially directed portion and an anti-extrusion means is abuttingly engaged with said radially directed portion to prevent extrusion of a high pressure sealing lip bonded to said casing.

It is a further object of this invention to provide a new and improved scraper seal asembly having a novel anti-extrusion means forming a part of the assembly and including a unique means to permit concentric molding of the anti-extrusion means and the shaft sealing lip.

Other objects not specifically set forth will become apparent from the following detailed description made in conjunction with the drawings wherein:

FIG. 1 is a longitudinal cross sectional view of the new and improved seal of the present invention;

FIG. 2 is a fragmentary partly sectioned installational view of the seal assembly illustrating the seal in half section in its operative association in the bore of the housing and in engagement with a partial shaft shown in full elevation;

FIG. 3 is an enlarged half section of a modified form of the invention;

Figure 5:
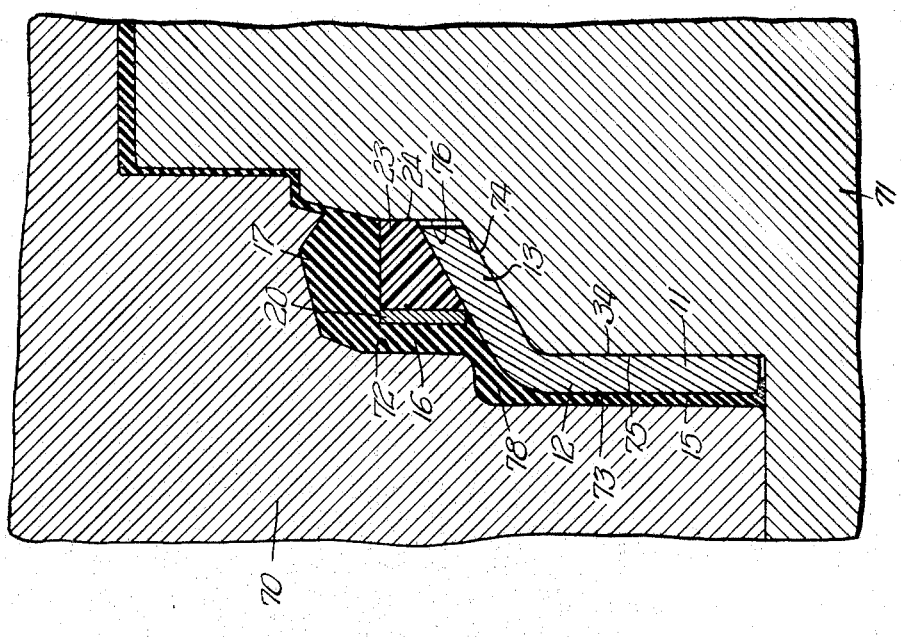
FIG. 5 is a view similar to FIG. 4 with the mold halves in the fully closed position.

The seal 10 of FIG. 1 includes an annular casing 11 formed from sheet metal by stamping or the like. Casing 11 includes a circumferential wall portion 12 of substantial axial extent merging at its inner end into a radially directed wall portion 13. The radially directed wall portion 13 in FIG. 1 may be of the frustoconical shape illustrated, terminating in an inner peripheral portion 14 whose axial dimension is defined by the thickness of the stamping.

Bonded to the outer surface of the circumferential wall portion 12 is a bore engaging annular layer of elastomer 15 or the equivalent which may be formed simultaneously and integrally with a sealing element 16. The sealing element 16 includes a fluid sealing lip 17 which is axially spaced from the radially directed wall portion 13 and in the free state has an inner diameter which is less than the diameter of the shaft of intended use.

Intermediate the sealing lip 17 and the radially directed wall portion 13, is formed an annular groove 18 having a cross section of right trapezoidal configuration. The outer or bottom wall portion of the groove 18 receives an endless confining ring 20 which may be formed from plastic, metal or any suitable equivalent which is substantially rigid. Disposed in the groove between the inner diameter of the endless ring 20 and filling the space between the inwardly facing surface 21 of the radial wall portion 13 and the outer wall 22 of the groove 18 formed by the sealing lip 17, is an anti-extrusion element 23. The surface forming the inside diameter of the anti-extrusion element 23 forms a circumferential shaft engaging portion 24 which is adapted to receive the shaft of intended use with a bearing fit.

On the opposite or outwardly facing side 25 of the radially directed wall 13 is positioned an annular wiper element 26 having a frustoconical shaft engaging portion 27. In the unstressed state, the inner and outer ends of the shaft engaging portions are of a lesser and greater diameter, respectively, than the shaft of intended use, thereby enhancing the ease of installation of the seal assembly. The outer surface of the wiper element 26 as well as that adjacent the radial wall 13 is shaped to conform to the inner surface of the casing 11.

An outwardly or axially facing surface 28 on the other side of the wiper 26 forms with circumferential wall portion 12 of the casing 11 and an L-shaped retainer stamping 29, an annular channel 30. Loosely received in the annular channel 30 is a scraper element 31 which consists of an endless washer-like ring.

The scraper ring 31 may be formed from any suitable material such as Phosphor bronze, stainless steel or the like which will not mar the shaft while still providing good scraping action. An inner circumferential portion 32 of the ring is dimensioned so that it will closely ride on a shaft while the outside diameter is of lesser dimension than the inside diameter 34 of the circumferential wall portion 12 forming the bottom of the channel 30. Sufficient axial clearance exists so that free floating action of the scraper 31 may be had both radially and axially.

A representative high pressure installation utilizing the seal assembly 10 of the present invention is illustrated in the half sectional view of FIG. 2 with a shaft 35 shown fragmentarily in full elevation while a machine housing 36 mounting the shaft 35 is shown fragmentarily. An annular stepped bore 37 is formed in the housing 36 by an inner cylindrical wall portion 38 and an outer cylindrical wall portion 39 of increased diameter relative to the inner wall portion 38 with a radial shoulder 40 joining the two. A retainer groove 41 may be formed in the outer end of the machine housing and receives a snap ring 42 which overlies the outer end of the annular casing 11 and maintains the sealing assembly 10 snugly within the cylindrical bore 37.

When the shaft seal assembly 10 is in the installed position shown, the inner peripheral portion 14 of the annular casing 11 is spaced from the surface of the shaft 35 a sufficient distance to preclude contact. Wiper 26 on installation constricts about the shaft 35 so that the junction of the outer wall 28 with the frustoconical shaft engaging portion 27 serves to wipe the shaft 35 free of fine foreign material as it reciprocates within the housing 36. The scraper ring 31 closely hugs the shaft 35 to remove any solid or large deposits such as ice, mud or the like from the shaft 35 prior to entry into the housing 36. Exemplary of one possible range of clearances, the scraper ring 31 may have a shaft clearance of approximately 0.0005 inch to provide good scraping action.

The sealing element 16 is snugly received within the housing bore 37 so that the outer circumference of the sealing element 16 and the elastomer layer 15 are in fluidtight engagement with the cylindrical wall portions 38 and 39. The anti-extrusion element 23 has the inner peripheral or shaft engaging portion 24 positioned around the shaft with a bearing fit, with the clearances being approximately of the same order as the scraper. Extreme fluid pressures within the machine housing 36 serve to distort the sealing element 16 from its molded shape to any form wherein the opposing forces are equalized. In the absence of an anti-extrusion ring, these forces tend to extrude the lip outwardly beneath the inner peripheral portion 14 of the casing 11. Any subsequent reciprocation of the shaft 35 under these hypothetical conditions will have a tendency to damage the sealing lip 17 resulting in loss of fluid.

The anti-extrusion element 31 in the present seal assembly positively prevents extrusion of the sealing element 15 due to its bridging the gap between the casing and the shaft. The close fit with the shaft does not leave sufficient clearance to permit extension of the sealing lip 17 therebetween. It is contemplated that the anti-extrusion element 23 may be formed of low friction materials such as a synthetic resin, plastic, leather, paper or like deformable materials.

The heavy fluid pressure acting against the radially exposed end of the sealing element is transmitted directly to the anti-extrusion ring 23. Such forces have a tendency to expand the ring along the radial wall 13 of the casing 11, however, the rigid confining ring 20 together with the radially directed portion 13 of the casing 11 serves to maintain the anti-extrusion ring 23 properly located around the shaft 35. Accordingly, the anti-extrusion ring 23 is free to deform radially inwardly a slight amount in response to the axial pressure assuming that the materials forming the ring are distortable, thus insuring a close fit without shaft damage.

In operation, on reciprocation of the shaft 35, the scraper ring 31 will remove the major or large accumulations of foreign matter from the shaft 35 while the wiper ring 26 excludes dust and other smaller foreign particles to prepare the shaft to enter the high pressure sealing region at the sealing lip 17. The anti-extrusion ring 23 will also exhibit a wiping action on the shaft to further insure against the entry of dust and like particles into the sealing area or region which could have a deleterious effect on the sealing action.

The sealing lip 17 with the fluid pressure acting along the end face is deformed into tight sealing engagement with the shaft 35, and acts against the radial end face 43 of the anti-extrusion ring 23. As noted above, this serves to deform the ring 23 into close engagement with the shaft 35 while precluding extrusion of the sealing element 16 since the annular rigid ring 20 holds the ring 23 against radial expansion. Additional bias to the sealing lip may be provided in the form of a spring, if desirable.

Referring now to FIG. 3, a modified form of the invention is illustrated in an enlarged fragmentary half section. The modified form of shaft seal assembly 50 includes an annular casing 51 having a circumferential wall portion 52 which is formed integral with a radially directed wall portion 53. The annular casing 51 in contrast to the casing 11, may be formed by machining a piece of tubular or solid stock to the illustrated shape. An inner cylindrical surface 54 is formed on circumferential wall portion 52 and merges with an outwardly facing frustoconical wall portion 55 terminating on an inner diameter greater than the shaft of intended use.

An axially extending flange or ring portion 56 is formed integral with the radially directed wall portion 53 and may be of lesser diameter than the circumferential wall portion 52. The axially extending ring portion 56 forms with an axially facing wall 57 two sides of a groove 58 opening toward the direction of fluid pressure. An annular sealing element 59 forms the third side of the groove 58 and is bonded to the outer circumference of the casing 51 joining a thin layer of elastomer 60 of appropriate diameter for fluidtight engagement with a machine housing bore.

An annular anti-extrusion ring 61 is received in the groove 58 and may be of a rectangular cross section to conform to the shape of the groove. The anti-extrusion ring 61 serves the same function and in the same manner as the anti-extrusion ring 23 in the embodiment of FIGS. 1 and 2, when installed in a machine housing such as the one shown at 36 in FIG. 2.

The seal assembly 50 is completed with a wiper element 62 and loosely held scraper ring 63 retained within the annular casing 51 by an L-shaped retainer element 64. These elements are identical in structure and function to the corresponding elements in the installation shown in FIG. 2. The major difference between the embodiment of FIGS. 1 and 3 is the formation of the confining ring 56 surrounding the anti-extrusion element 61 integrally with the annular casing 51. Accordingly, the anti-extrusion element is shaped accordingly to conform to and fill the groove 58.

Figure 4:
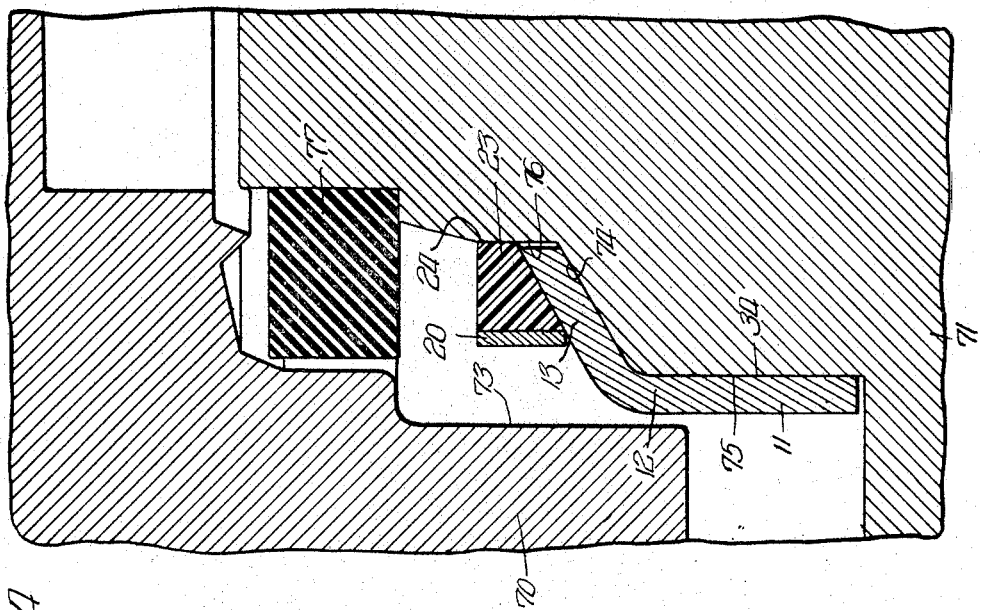
FIG. 4 is a fragmentary half section of a pair of mold halves adapted for forming the seal embodiment of FIGS. 1 and 2 with the mold halves in the relative position assumed immediately prior to closure.

Referring now to FIG. 4 and 5, the novel method of molding the anti-extrusion element in situ simultaneously with the formation of the sealing element 16 will be described. Upper and lower mold halves are indicated at 70 and 71 respectively and co-operate to form in the closed position a seal element cavity 72 in FIG. 5. The upper mold half 70 is provided with a cylindrical wall portion of increased diameter 73 relative to the annular casing 11. This permits the elastomeric mold material to flow around the cover the outer circumference of the annular casing 11 to form the elastomeric layer 15 which assists to seal it to the housing 36.

The lower mold half 71 is provided with a frustoconical shoulder portion 74 joined by a radiused portion to a cylindrical wall 75, thus conforming to the shape of the inside diameter of the circumferential wall portion 12 of annular casing 11. With the mold so shaped, location of the casing 11 within the mold in a properly oriented position is assured, without requiring unusually close tolerances in the forming of the casing 11, or excessive time in positioning the same within the mold.

The frustoconical wall 74 at its smallest diameter terminates in a cylindrical wall 76 which is of lesser diameter than the inner peripheral portion 14 of the casing 11. The outside diameter of the wall portion 76 is dimensioned so as to receive the anti-extrusion ring 23 with a close fit such as would occur in use. The retainer ring 20 is positioned around the outer periphery of the anti-extrusion ring 23 to confine the same against the high pressures experienced in molding and maintain it concentric with the axis of the mold. An annular washer 77 of mold material, more commonly referred to as a "prep" is placed in the lower mold half 71 and the upper mold may then be brought to the closed position shown in FIG. 5.

During the closing of the molds, the mold material 78 completely fills the cavity and engulfs or surrounds the anti-extrusion ring 23 along its exposed side and the associated retainer ring 20 as well as the outer portion of the casing 11. Through the molding cycle the ring 20 and radially directed wall 13 of the annular sheet metal stamping forming the casing 11 serve to maintain the anti-extrusion ring 23 properly located so as to be coaxial with the sealing element 16 and casing 11.

The anti-extrusion ring 23 may be treated with a cement or a thermosetting adhesive prior to molding in order to adhere to the groove during the molding cycle. Obviously, if desired, the adhesive or cement can be omitted and a dummy anti-extrusion ring inserted if the contemplated materials of the finished anti-extrusion member are incapable of standing the heat of the molding operation. After the cure cycle the dummy anti-extrusion ring may be removed and replaced with the one designed for the particular shaft sealing operation intended. In either event, the annular confining ring 20 will always assure the proper locating of the anti-extrusion ring and confine it against radial expansion.

From the foregoing it can be seen that a novel seal assembly and molding method is presented which provides remarkable advantages. Among these are the provision of a compact unitized scraper, wiper and high pressure seal having an anti-extrusion ring, and a precision and economically manufactured scraper seal arrangement having anti-extrusion means to protect the fluid seal against extrusion by the highly pressurized fluids sealed against. The novel molding method insures proper positioning of the anti-extrusion ring in the mold cycle in order that the fluid seal and anti-extrusion ring may be formed and positioned in a single molding step to insure an economical and high quality product. Other advantages of significance but lesser importance than those enumerated above are also obtained by the novel shaft seals and method of molding.

We claim:

1. A shaft seal adapted to seal a reciprocating shaft and to be mounted in an opening extending into the interior of a machine housing, said seal including an annular casing having an axially outer end and an axially inner portion including a flange having a substantial inward radial extent and terminating in an inner periphery having a slightly greater diameter than that of said reciprocating shaft to be sealed, a fluid sealing element mounted on at least a part of said axially inner portion, said sealing element having an axially inwardly facing surface of a substantial extent, said surface being presented to the interior of said housing for exposure to high fluid pressure, and an anti-extrusion means for preventing extrusion of said sealing element axially of said seal, along said shaft, said means being disposed between said sealing element and said inner portion of said casing, the inner peripheries of said anti-extrusion means and said sealing element, in use, being of substantially the same diameter and of reduced diameter in relation to the said inner periphery of said flange.

2. A shaft seal as defined in claim 1 in which means are provided for preventing outward deformation of a portion of said anti-extrusion means, and in which said portion of said anti-extrusion means is confined, in use, between said seal element, said flange, said means for preventing deformation, and said shaft.

3. A shaft seal as defined in claim 1 in which said anti-extrusion means includes an inner, flexible, portion with a shaft-engaging surface, and a rigid, radially outer supporting portion, said outer supporting portion having an axial extent substantially equal to the axial extent of said inner portion.

4. A shaft seal as defined in claim 1 in which said seal element and said anti-extrusion means are joined to each other along a radially extending interface, the radial extent of said interface being substantially equal to the radial extent of said anti-extrusion means.

5. A shaft seal as defined in claim 1 in which said anti-extrusion means comprises an inner, flexible portion and a rigid outer support portion, and in which said inner portion comprises a lubricous plastic material.

6. A shaft seal as defined in claim 1 in which further includes a wiper element disposed radially inwardly of said casing and axially outwardly of said sealing element, for engagement with said shaft.

7. A shaft seal as defined in claim 1 which further includes a scraper ring disposed radially inwardly of said casing and axially outwardly of said sealing element, for engagement with said shaft.

8. A shaft seal as defined in claim 1 which further includes a wiper element disposed radially inwardly of said casing and axially outwardly of said sealing element, and a scraper ring adjacent and axially outwardly of said wiper element, and within said casing.

9. A shaft seal as defined in claim 3 wherein said outer supporting portion comprises a metal ring.

10. A shaft seal as defined in claim 3 in which said outer supporting portion comprises an axially extending ring integrally formed on said flange and of enlarged diameter relative to said inner periphery of said flange.

References Cited

UNITED STATES PATENTS 2,815,973  10/1957  Jackson _____ 277—188
2,966,376  12/1960  Reynolds _____ 277—32 X
3,132,869   5/1964  Campbell _____ 277—188 X LAVERNE D. GEIGER, Primary Examiner JEFFREY S. MEDNICK, Assistant Examiner U.S. Cl. X.R.
277—52, 183, 188